United States Patent Office 2,876,252
Patented Mar. 3, 1959

2,876,252

PROCESS FOR THE PRODUCTION OF TEREPHTHALIC ACID DIMETHYL ESTER

Rudolf Lotz, Klingenberg (Main), and Richard Gerlach, Obernburg (Main), Germany, assignors to Vereinigte Glanzstoff-Fabriken A. G., Wuppertal-Elberfeld, Germany No Drawing. Application March 14, 1956
Serial No. 571,367

Claims priority, application Germany March 15, 1955

7 Claims. (Cl. 260—475)

This invention relates to a process for the production of terephthalic acid dimethyl ester, and more particularly to an improved process in the esterification reaction of terephthalic acid with methanol.

Terephthalic acid dimethyl ester is especially useful as a raw material in the manufacture of linear, aromatic polyesters, particularly in the form of fibers and films. It is generally desirable for the raw materials to be in highly purified form when employed in the manufacture of such polyesters.

It is known that dicarboxylic acids can be esterified in the presence of excess alcohol and catalysts at the boiling point of the alcohol. It is also known that a low boiling point carboxylic acid can be esterified by evaporation of the acid with the desired alcohol for reaction at an elevated temperature. However, this method is not suitable where the acid is normally a solid at the usual reaction temperatures. In reacting a solid dicarboxylic acid such as terephthalic acid, which sublimes without melting at about 300° C., with an alcohol such as methanol, one method previously employed has been to suspend terephthalic acid in an inert liquid of high boiling point and passing vaporized methanol through this suspension. The terephthalic acid dimethyl ester produced in this reaction remains in the suspension and can only be separated from it by a very cumbersome procedure. In another previous method wherein terephathalic acid is esterified by reacting the solid acid at elevated temperatures with vaporized methanol, the resulting terephthalic acid dimethyl ester is immediately distilled away from the reaction chamber. However, because of the relatively high temperatures employed in this method, monoesters and/or dimethyl ethers are formed which seriously disturb the reaction and prevent good yields of high purity. Also, the reaction time of this process is comparatively long. This latter method can be accomplished, for example, as desribed in U. S. Patent No. 2,806,052.

One object of the invention is to provide a process for the production of terephthalic acid dimethyl ester in which large yields are obtained with a very high purity of the product. Another object of the invention is to provide a continuous process for the production of terephthalic acid dimethyl ester, and also to provide a process which can be carried out in a relatively short reaction time. Other objects will appear hereinafter.

In accordance with the invention, it has now been discovered that such objects can be attained in the esterification of terephthalic acid with methanol when reactants including finely divided solid terephthalic acid and finely dispersed methanol in liquid to gaseous form are sprayed into a reaction chamber heated to from 100° C. to 350° C., preferably to a reaction temperature below that temperature at which terephthalic acid sublimes, and still more preferably to from about 280° C. to 300° C.

In the process, solid terephthalic acid in finely divided or powdered form is sprayed into the reaction chamber through a suitable jet, spout, nozzle or the like, with the aid of an inert gas such as nitrogen. Finely dispersed methanol, either in the liquid or in the gaseous phase, is introduced or charged into the reaction chamber through a second jet, spout, nozzle or other suitable spraying means for intimate mixture with the finely dispersed terephthalic acid. It is also advantageous to introduce the reactants into the heated reaction chamber through a single line by forming a suspension of finely divided terephthalic acid in liquid methanol and spraying this suspension into the reaction chamber.

The presence of suitable esterification catalysts such as, e. g., boron phosphate, phosphoric acid, or hydrochloric gas, facilitates the reaction. If hydrochloric gas is used, it can be introduced through a separate charge line leading into the reaction chamber or can also be advantageously introduced together with gaseous methanol. Solid catalysts are preferably employed in finely divided form and can be introduced with the aid of an inert gas in the same manner as the solid terephthalic acid is introduced. Alternatively, finely divided solid catalysts can be introduced by spraying together with the solid terephthalic acid or can be included in a suspension with methanol. Liquid catalysts can likewise be introduced alone or together with the other reactants as a liquid-liquid mixture or liquid-solid suspension.

It is preferable to introduce the reactants by spraying into one end of a reaction vessel for co-current flow therethrough with an intimate mixing of the reactants. The vessel is heated by any suitable means, such as electrical heating elements, to the desired reaction temperature. After esterification has taken place, the terephthalic acid dimethyl ester is easily recovered from the reaction mixture, preferably by condensation to a crystalline solid. The inert gas and excess gaseous methanol are advantageously recycled by a suitable membrane pump or similar means in gaseous connection with the reaction vessel, preferably at a point where esterification is substantially completed.

Various forms of reaction vessels can be employed in carrying out the process, as will be readily apparent to those skilled in the art. In general, a tubular or cylindrical elongated vessel is most advantageous in obtaining a co-current flow and intimate mixing of the reactants. A particular reaction vessel which has been found to be mots advantageous in the process is an elongated reaction tube of circular cross-section such as, for example, a cylindrical tube 300 cm. long and 40 cm. in diameter. It has further been found to be especially advantageous to arrange spray means in the form of jets, spouts, nozzles or the like, in such a manner that the reactants, particularly the finely divided solid terephthalic acid, will be directed in a spiral or helical path along the interior wall of a reaction tube having a substantially circular cross-section.

The invention is further illustrated but not limited by the following examples.

*Example 1*

1000 g. of powdered terephthalic acid is introduced into a cylindrical tube about 300 cm. long and 40 cm. in diameter by spraying with the aid of nitrogen through a nozzle which is located in such a manner that the finely divided terephthalic acid flows helically along the inside cylindrical wall of the reaction tube. At the same time, 1000 cc. methanol is introduced into the heated tube through a second nozzle. Through still another line, gaseous hydrochloric acid is introduced in a weak stream. The reaction tube is heated electrically to 280° C. The esterification reaction proceeds throughout the length of the tube, and the terephthalic acid dimethyl ester produced by the reaction is collected in the form of prismatic needles of very high purity in a cooled condenser. A membrane pump is installed in the lower part of the reaction tube so as to remove the inert gas and excess methanol from the reaction space. These gases can then be recirculated with condensation of methanol for re-use in liquid form. The yield of terephthalic acid dimethyl ester is 98% with a melting point of 141° C.

*Example 2*

The procedure is generally the same as that described in Example 1. However, 60 g. of finely divided boron phosphate as a catalyst is added to the finely divided terephthalic acid and both substances are sprayed together with the aid of the inert gas into the reaction tube. Methanol is introduced in gaseous form instead of the liquid form employed in Example 1. Recycled gaseous methanol is then re-used directly without condensation. The yield of the terephthalic acid dimethyl ester is 99% with a melting point of 141° C.

*Example 3*

A suspension of 1000 g. terephthalic acid, 60 cc. 85% phosphoric acid, and 1000 cc. methanol is sprayed with the aid of nitrogen through a nozzle into a cylindrical reaction tube electrically heated to from 280° C. to 300° C. in such a manner that the finely distributed suspension passes helically through the reaction tube. The resulting terephthalic acid dimethyl ester is collected in a cooled condenser in the form of long prismatic needles having a melting point of 141° C. The yield is 97%. Nitrogen and excess methanol are recirculated by a suitable membrane pump.

The invention is hereby claimed as follows:

1. In a process for the production of terephthalic acid dimethyl ester, the improvement comprising: spraying finely divided solid terephthalic acid and finely dispersed methanol in liquid to gaseous form into a reaction chamber for co-current flow therethrough of the resulting intimate reaction mixture, said reaction chamber being maintained at a temperature of from 100° C. to 350° C.; and recovering terephthalic acid dimethyl ester by condensation from the finely dispersed components of the reaction mixture.

2. An improved process for the production of terephthalic acid dimethyl ester comprising: spraying finely divided solid terephthalic acid, finely dispersed methanol in liquid to gaseous form, and a finely dispersed esterification catalyst into a reaction chamber for co-current flow therethrough of the resulting intimate reaction mixture, said reaction chamber being maintained at a temperature of from 100° C. to 350° C.; and recovering terephthalic acid dimethyl ester by condensation from the finely dispersed components of the reaction mixture.

3. An improved process as claimed in claim 2 wherein the reaction chamber is maintained at a temperature of about 280° C. to 300° C.

4. An improved process as claimed in claim 3 wherein the esterification catalyst is selected from the group consisting of boron phosphate, phosphoric acid and hydrochloric acid.

5. An improved process for the production of terephthalic acid dimethyl ester comprising: spraying a finely dispersed suspension of finely divided solid terephthalic acid and liquid methanol and a finely dispersed esterification catalyst into a reaction chamber for co-current flow therethrough of the resulting intimate reaction mixture, said reaction chamber being maintained at a temperature of from about 280° C. to 300° C.; and recovering terephthalic acid dimethyl ester by condensation from the finely dispersed components of the reaction mixture.

6. An improved process for the production of terephthalic acid dimethyl ester comprising: directing a spray of reaction components including finely divided solid terephthalic acid, finely dispersed methanol in liquid to gaseous form and a finely dispersed esterification catalyst for co-current helical flow through an elongated reaction zone of circular cross-section; heating the resulting intimately mixed reaction components in said reaction zone to a temperature of from 100° C. to 350° C.; and condensing the resulting terephthalic acid dimethyl ester as a crystalline solid.

7. An improved process as claimed in claim 6 wherein the reaction components in said reaction zone are heated to a temperature of from about 280° C. to 300° C.

References Cited in the file of this patent

UNITED STATES PATENTS

| | | |
|---|---|---|
| 2,020,356 | Hawley | Nov. 12, 1935 |
| 2,076,111 | Bannister | Apr. 6, 1937 |
| 2,578,312 | Miller et al. | Dec. 11, 1951 |
| 2,806,052 | Siggel | Sept. 10, 1957 |